US009068030B2

(12) United States Patent
Song et al.

(10) Patent No.: US 9,068,030 B2
(45) Date of Patent: Jun. 30, 2015

(54) PROPYLENE HOMOPOLYMER HAVING HIGH MELT STRENGTH AND PREPARATION METHOD THEREOF

(75) Inventors: Wenbo Song, Beijing (CN); Meifang Guo, Beijing (CN); Shijun Zhang, Beijing (CN); Wenjun Wei, Beijing (CN); Honghong Huang, Beijing (CN); Luqiang Yu, Beijing (CN); Tao Liu, Beijing (CN); Huijie Hu, Beijing (CN); Huan Xu, Beijing (CN); Peiqian Yu, Beijing (CN); Xiaomeng Zhang, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 313 days.

(21) Appl. No.: 13/574,435

(22) PCT Filed: Jan. 21, 2011

(86) PCT No.: PCT/CN2011/000107
§ 371 (c)(1),
(2), (4) Date: Oct. 9, 2012

(87) PCT Pub. No.: WO2011/088754
PCT Pub. Date: Jul. 28, 2011

(65) Prior Publication Data
US 2013/0023598 A1 Jan. 24, 2013

(30) Foreign Application Priority Data

Jan. 22, 2010 (CN) .......................... 2010 1 0000974
Jan. 22, 2010 (CN) .......................... 2010 1 0000975

(51) Int. Cl.
C08F 4/16 (2006.01)
C08F 4/58 (2006.01)
C08F 2/38 (2006.01)
C08F 110/06 (2006.01)

(52) U.S. Cl.
CPC .................................... *C08F 110/06* (2013.01)

(58) Field of Classification Search
CPC .............................. C08F 4/6465; C08F 110/06
USPC .......... 526/64, 65, 123.1, 128, 126, 142, 151, 526/148, 905, 351
IPC ..................................................... C08F 110/06
See application file for complete search history.

(56) References Cited

U.S. PATENT DOCUMENTS

| 4,861,847 A | 8/1989 | Mao et al. |
| 5,844,046 A * | 12/1998 | Ohgizawa et al. ............. 525/270 |
| 6,084,041 A | 7/2000 | Andtsjö et al. |
| 6,111,039 A * | 8/2000 | Miro et al. ..................... 526/128 |
| 6,350,828 B1 | 2/2002 | Takaoka et al. |
| 6,683,017 B2 | 1/2004 | Gao et al. |
| 6,686,433 B1 | 2/2004 | Miro et al. |
| 6,703,339 B2 | 3/2004 | Li et al. |
| 6,875,826 B1 * | 4/2005 | Huovinen et al. ............... 526/64 |
| 6,900,281 B2 * | 5/2005 | Streeky et al. ................. 526/348 |
| 7,217,772 B2 * | 5/2007 | Migone et al. ................. 526/65 |
| 7,365,136 B2 | 4/2008 | Huovinen et al. |
| 7,388,061 B2 | 6/2008 | Gao et al. |
| 7,393,806 B2 * | 7/2008 | Bradley et al. ................ 502/116 |
| 7,521,512 B2 * | 4/2009 | Wilson .......................... 526/128 |
| 7,531,607 B2 * | 5/2009 | Vestberg .................... 526/125.3 |
| 8,067,510 B2 * | 11/2011 | Sheard et al. ................... 526/65 |
| 2001/0007008 A1 * | 7/2001 | Shamshoum et al. ..... 526/125.3 |
| 2009/0326171 A1 * | 12/2009 | Song et al. ....................... 526/64 |
| 2010/0210795 A1 * | 8/2010 | Clarembeau et al. ........... 526/65 |

FOREIGN PATENT DOCUMENTS

| CN | 85100997 | 1/1987 |
| CN | 1090854 A | 8/1994 |
| CN | 1091748 A | 9/1994 |
| CN | 1156999 A | 8/1997 |
| CN | 1241196 A | 1/2000 |
| CN | 1258680 A | 7/2000 |
| CN | 1258683 A | 7/2000 |
| CN | 1258684 A | 7/2000 |
| CN | 1298887 A | 6/2001 |
| CN | 1298888 A | 6/2001 |
| CN | 1330086 A | 1/2002 |
| CN | 1436796 A | 8/2003 |

(Continued)

OTHER PUBLICATIONS

International Search Report mailed Apr. 7, 2011, for International Application No. PCT/CN2011/000107.
International Preliminary Report on Patentability and Written Opinion of the International Searching Authority mailed Apr. 7, 2011, for International Application No. PCT/CN2011/000107.
Extended European Search Report for European Patent Application No. 11734336.8 mailed Mar. 27, 2015 (6 pages).

*Primary Examiner* — Rip A Lee
(74) *Attorney, Agent, or Firm* — Finnegan, Henderson, Farabow, Garrett & Dunner, LLP

(57) ABSTRACT

The present invention provides a process for preparing high melt strength propylene polymer by direct polymerization, comprising that a propylene polymer with wide molecular weight distribution and containing "very high molecular weight fraction" can be prepared by controlling the species and ratios of the external electron donors in the Ziegler-Natta catalyst system at different reaction stages according to the requirement for different molecular weight fractions in the different propylene polymerization stage of the series operation, and said polymer has excellent mechanical properties, especially with very high melt strength. The present invention also provides a propylene homopolymer with high melt strength, comprising the following features: (1) the MFR is 0.2-10 g/10 min at 230° C. with a load of 2.16 kg; (2) the molecular weight distribution $M_w/M_n$ is 6-20; (3) the content of the fraction with a molecular weight higher than 5,000,000 is higher than or equal to 0.8 wt %; (4) $M_{z+1}/M_n$ is higher than or equal to 70. Said homopolymer can be used in the preparation of foam products, thermoforming products, biaxial stretching films, blown films and blow-molded products.

19 Claims, No Drawings

(56) References Cited

FOREIGN PATENT DOCUMENTS

| | | | | |
|---|---|---|---|---|
| CN | 1612901 A | | 5/2005 | |
| CN | 101058654 A | | 10/2007 | |
| CN | 101180325 A | | 5/2008 | |
| CN | 102453163 A | * | 5/2012 | ............ C08F 10/06 |
| CN | 102816269 A | * | 12/2012 | ............ C08F 210/06 |
| CN | 102816270 A | * | 12/2012 | ............ C08F 210/08 |
| EP | 1726602 A1 | * | 11/2006 | ............ C08F 110/06 |
| JP | 4370103 A | | 12/1992 | |
| JP | 4372610 A | | 12/1992 | |
| WO | WO 99/20663 | | 4/1999 | |
| WO | WO 03/106512 | | 12/2003 | |
| WO | WO 2006/125672 A1 | | 11/2006 | |
| WO | WO 2007/124680 A2 | * | 11/2007 | ............ C08F 10/06 |

* cited by examiner

PROPYLENE HOMOPOLYMER HAVING HIGH MELT STRENGTH AND PREPARATION METHOD THEREOF

TECHNICAL FIELD

The present invention relates to a propylene homopolymerization process for preparing polypropylene with high melt strength in multi-steps. The present invention also relates to a propylene polymer, and more particularly, to a propylene homopolymer with high melt strength, which is especially suitable for preparing foam products, thermoforming products, biaxial stretching films, blown films and blow molded products.

BACKGROUND

Propylene homopolymer is widely used in the processing fields of injection, extrusion, tape casting and biaxial stretching due to the tailoring structure thereof. However, the common polypropylene molecular chain is of linear structure, which is unlike amorphous polymers, such as polystyrene PS with a region having property similar to the rubber elasticity in a wide temperature range. Thus, polypropylene cannot be thermoformed in a wide temperature range. Meanwhile, the softening point of polypropylene is close to its melt point. When the temperature is higher than the melt point, the melt strength and melt viscosity of polypropylene will decrease rapidly, thus causing the following problems including uneven wall thickness of the products during thermoforming, edges curling and shrinkage that would easily appear during extrusion, coating and rolling, and foam collapse during extrusion foaming etc. Therefore, the use of polypropylene in the fields of thermoforming, foaming and blow molding is limited. As a result, development of polypropylene with high melt strength and good ductility is always an interest issue. Said high melt strength polypropylene (HMSPP) means that the melt can bear higher strength at tensile fracture. In general, as to the current propylene homopolymer with a melt flow rate (MFR) of about 2 g/10 min, the higher melt strength thereof is up to 0.8 to 1N.

The main factor that affects the polypropylene melt strength is the molecular structure of the polymer, which comprises the size of the molecular weight, the molecular weight distribution, whether the molecular chain comprises long branched chains or not, the length and distribution of the branched chains, and so on. Generally, the larger the molecular weight of polypropylene is, the higher the melt strength of polypropylene is. However, the larger the molecular weight of polypropylene is, the more unfavorable it is for post-processing forming performance of propylene polymer. Therefore, taking the actual application of the materials into account, it is desirable to enable polypropylene to have a wider molecular weight distribution. In addition, it is also important to enable the polymer to contain a fraction with very high molecular weight, which can obviously increase the melt strength of polypropylene. In order to obtain propylene polymer with the best performance, the ideal polymer product should comprise a small amount of polymer fraction with very high molecular weight, a certain amount of polymer fraction with relatively high molecular weight and a large amount of polymer fraction with low molecular weight.

The disclosed process for increasing the melt strength of polypropylene generally comprises the method of increasing the polypropylene molecular weight, improving the molecular weight distribution or introducing branched structures by polymerization process technology, or the method of blending polypropylene with other amorphous or low crystallinity resins and elastomers during the polymer molding process. Among others, adjusting the polymerization process technology is commonly used, which comprises preparing polypropylene with wide molecular weight distribution by using a plurality of reactors or obtaining polypropylene with long branched-chains by using metallocene catalyst and in-situ polymerization, thus enhancing the melt strength of the final polymer. The most commonly used method is to prepare polypropylene with wide molecular weight distribution by using a plurality of reactors connected to each other in series. Generally, polypropylene with wide molecular weight distribution (MWD) is obtained by in-series polymerization in different reactors that are suitable for producing polymers with different molecular weights with different hydrogen amounts and different copolymerization monomers being selected. For example, one of the reactors is suitable for producing polymer with higher molecular weight, while another is suitable for producing polymer with lower molecular weight.

For example, U.S. Pat. No. 6,875,826 and U.S. Pat. No. 7,365,136 both disclose a process for preparing propylene polymers with high melt strength and wide molecular weight distribution. In the process, the multi-stage (in two reactors) propylene homopolymerization or copolymerization is carried out in tubular loop-gas phase polymerization reactors connected to each other in series by selecting a Ziegler-Natta catalyst with lower hydrogen response, wherein said Ziegler-Natta catalyst is foremost featured by using a siloxane containing cycloalkyl, such as dicyclopentyl dimethyl silane, as the external electron donor. Through controlling the hydrogen concentration in each reactor, polypropylene of high molecular weight fraction, i.e., MFR<0.1 g/10 min, is produced in the first stage, with the weight content thereof in a range of 10 to 35%; polypropylene of low molecualr weight fraction, i.e., MFR>0.5 g/10 min, is produced in the second stage, with the weight content thereof in a range of 65 to 90%; and the MFR of the final polymer is in a range of 0.1 to 20 g/10 min. Finally it is obtained after reaction a linear propylene homopolymer with high melt strength and a wide molecular weight distribution (Mw/Mn>6).

As well known, as to propylene polymerization, the species of the external electron donor will generally influence on the stereoregularity and molecular weight distribution of polymer significantly. When the above process is used to prepare homopolypropylene with wide molecular weight distribution in a plurality of reactors, it is desirable that the molecular weight and stereoregularity of the high molecular weight fraction, which can determine the mechanical properties of polymer, are as high as possible, especially with a certain amount of very high molecular weight fraction, while the molecular weight of low molecular weight fraction, which can determine the extrusion properties of polymer, is as low as possible and also with a higher content. However, the composition and characteristics of the catalyst are unchanged in the two reactors of the above patents. As a result, the reaction response of the catalyst on the molecular weight regulator, i.e., hydrogen, is uniform in the two-stage polymerization, which has a certain limitation for controlling or adjusting the properties of polymer chains.

Specifically, when the external electron donor with lower hydrogen response is used in the catalyst system, the molecular weight of polymer can be higher in the first stage for producing higher molecular weight fraction. However, when in the second stage for producing the lower molecular weight fraction, very high hydrogen content is required to meet the actual requirement because of its insensitivity to hydrogen. If the external electron donor with higher hydrogen response is used in the catalyst system, although the hydrogen amount is little in the second stage for producing lower molecular weight fraction, the molecular weight cannot be high enough in the first stage for producing higher molecular weight fraction, thus reducing the mechanical properties of the final products.

Moreover, CN1241196A describes a polypropylene resin composition and the use thereof; wherein a two-step method is used to obtain the polypropylene resin composition with high melt tension. In the method, polypropylene with high molecular weight is prepared in the first stage without hydrogen, and polypropylene with low molecular weight is prepared in the presence of hydrogen in the second stage. One and the same external electron donor, such as dicyclopentyl dimethoxy silane, is used in the whole process. The prepared polypropylene comprises the high molecular weight fraction with a molecular weight higher than $1.5 \times 10^6$. However, it still cannot solve the problems associated with the foregoing patents.

In CN1156999A titled as "The dual donor catalyst system for olefin polymerization", two different catalysts are used in different stages. Tetraethoxy silane is used as the external electron donor in the first stage, and dicyclopentyl dimethoxy silane is used as the external electron donor in the second stage. Both of CN1612901A and U.S. Pat. No. 6,686,433B1 also similarly disclose the teachings. The objects of these patents are not to obtain macromolecular so as to further obtain polypropylene with high melt strength. The process steps thereof similarly comprise: first preparing the smaller molecular polypropylene, then preparing the larger molecular polypropylene in the second stage, thus obtaining polyolefins with high crystallinity. If using said processes described in these patents to produce polypropylene, said external electron donor with a high hydrogen response, which is added in the first stage for preparing low molecular weight polymer, also works in the second stage, so that super molecular weight polymer cannot be prepared in the second stage. Similarly, the high melt strength propylene homopolymer with advantageous mechanical property and processing property cannot be obtained according to the above patents.

As to the actual applications of some polypropylene, such as foaming products, the melt flow rate (MFR) thereof is required to be about 2 to 3 g/10 min. Because of limitation in the above polymerization processes, the distribution of the three fractions, i.e., the very high molecular weight fraction, the high molecular weight fraction and the low molecular weight fraction, in the polymers is not satisfactory. Thus, the properties of the final polymer are harmed to some extent.

SUMMARY OF THE INVENTION

In order to solve the problems present in the prior arts, the present invention provides a process for preparing propylene homopolymer with high melt strength through direct polymerization.

The inventor has found after intensive experiments that, a propylene polymer with wide molecular weight distribution and containing "very high molecular weight fraction" can be prepared by controlling the species and ratios of the external electron donors in the Ziegler-Natta catalyst system at different reaction stages, preferably in combination with controlling the amount of the molecular weight regulator according to the requirement for different molecular weight fractions in different propylene polymerization stage of the series operations. Said polymer has excellent mechanical properties, especially very high melt strength.

The propylene polymerization process of the present invention comprises a propylene homopolymerization reaction of two or more stages carried out in two or more reactors connected in series, wherein: in the first stage, in the presence of Ziegler-Natta catalyst comprising a first external electron donor component, propylene homopolymerization is carried out under a polymerization temperature of 50 to 100° C., the MFR of the polymer obtained being controlled within the range of 0.01 to 0.3 g per 10 min; and in the second stage, based on the resulting material from the first stage, a second external electron donor component is added to further carry out the propylene homopolymerization in the presence of hydrogen; the MFR of the polymer finally obtained is controlled within the range of 0.2 to 10 g per 10 min, wherein the hydrogen response of the first external electron donor is lower than that of the second external electronic donor.

Preferably, in the first stage, the Ziegler-Natta catalyst is composed of the following components: (1) a solid catalyst component with magnesium, titanium, halogen and internal electron donor as the main components; (2) an organic aluminium component; and (3) the first external electron donor component, wherein the weight ratio of component (1) to component (2), based on the ratio of titanium to aluminium, is 1:10-500, and the weight ratio of component (2) to component (3) is 10-150:1; and in the second stage, the weight ratio of the organic aluminium component to the second external electron donor component added is 1-50:1.

Preferably, in order to meet the requirements on different molecular weight fractions, in the first stage, the amount of the first external electron donor is adjusted such that the weight ratio of the first external electron donor to the organic aluminium is 1:15-100; and in the second stage, the second external donor component is added according to the amount of the organic aluminium component added in the first stage, such that the weight ratio of the second external donor component to the organic aluminium is 1:2~20.

The hydrogen adding amounts in the first stage and the second stage are controlled according to the requirement on the final MFR. Preferably, in the first stage, the hydrogen content is less than or equal to 300 ppmV.

The first external electron donor component is shown as the general formula $R^1{}_n Si(OR^2)_{4-n}$, wherein $R^1$, which may be identical to or different from each other, can be ($C_3$-$C_6$) branched or cyclized aliphatic groups, $R^2$ is ($C_1$-$C_3$) straight chain aliphatic groups, such as methyl, ethyl or propyl, and n is 1 or 2.

The second external electron donor is shown as the general formula $R^3{}_n Si(OR^4)_{4-n}$, wherein n is 0 or 1 or 2, and $R^3$ and $R^4$, which may be identical to or different from each other, can be ($C_1$-$C_3$) straight chain aliphatic groups. Alternatively, the second external electron donor is shown as the general formula $R^5 R^6 Si(OR^7)_2$, wherein $R^5$ is ($C_1$-$C_3$) straight chain aliphatic groups, $R^6$ is ($C_3$-$C_6$) branched or cyclized aliphatic groups, and $R^7$ is ($C_1$-$C_3$) straight chain aliphatic groups.

The productivity ratio of the first stage to that of the second stage is 30:70 to 70:30, preferably 40:60 to 60:40.

In the polymerization process of the present invention, the catalyst for propylene polymerization comprises, but is not limited to, the Ziegler-Natta catalyst. The Ziegler-Natta catalyst used has been well documented, preferably the catalyst with high stereoselectivity. Said Ziegler-Natta catalyst with high stereoselectivity herein means that can prepare propylene homopolymer with isotactic index of more than 95%. Such catalyst generally comprises: (1) solid catalyst component, preferably solid catalyst active component containing Ti, (2) organic aluminium compound cocatalyst component, and (3) external electron donor component.

The specific examples comprising such active solid catalyst component (1) can be found in CN85100997, CN98126383.6, CN98111780.5, CN98126385.2, CN93102795.0, CN00109216.2, CN99125566.6, CN99125567.4 and CN02100900.7. Said catalyst can be directly used, or added after pre-complexing and/or pre-polymerization. The catalysts described in CN85100997, CN93102795.0, CN98111780.5 and CN02100900.7 are particularly advantageous when being used in the preparation process for high melt strength polypropylene of the present invention.

The cocatalyst component (2) of the present invention is the organic aluminium compound, preferably alkylaluminium compound, more preferably trialkylaluminium, such as triethyl aluminium, triisobutyl aluminium and tri-n-butyl aluminium, wherein the ratio of the solid catalyst component containing Ti to the organic aluminium cocatalyst component, based on the weight ratio of Al to Ti, is 10-500:1.

The external electron donors with different properties are added into different reactors according to the requirement for different molecular weight fractions. Specifically, according to the present invention, it needs to prepare propylene polymer with high molecular weight fraction in the first stage, i.e. in the first reactor; then, external electron donor with lower hydrogen response is selected so as to enable said fraction having even higher molecular weight. The external electron is shown as the general formula $R^1{}_n Si(OR^2)_{4-n}$, wherein $R^1$, which may be identical to or different from each other, can be $(C_3\text{-}C_6)$ branched or cyclized aliphatic groups, and preferably e.g. cyclopentyl, iso-propyl or cyclohexyl, $R^2$ is $(C_1\text{-}C_3)$ straight chain aliphatic groups, such as methyl, ethyl or propyl, and n is 1 or 2, preferably 2. Specific compounds can comprise dicyclopentyl dimethoxy silane, diisopropyl dimethoxy silane, dicyclohexyl dimethoxy silane, diisobutyl dimethoxy silane, and so on.

Preferably, the first external electron is dicyclopentyl dimethoxy silane and/or diisopropyl dimethoxy silane.

The MFR of the polymer obtained in the first stage is controlled within a range of 0.01 to 0.3 g per 10 min. According to actual needs, it is common to select that no molecular weight regulator is added or a very small amount of hydrogen (less than or equal to 300 ppmV) is added as the molecular weight regulator into the first reactor so as to obtain the high molecular weight fraction.

Based on the resulting material of polymerization from the first stage, a second external electron donor component and a molecular weight regulator (hydrogen) are added for the second stage of homopolymerization, and the MFR of the polymer finally obtained is controlled within the range of 1 to 10 g per 10 min.

The second external electron donor component is shown as the general formula $R^3{}_n Si(OR^4)_{4-n}$, wherein n is 0 or 1 or 2, and $R^3$ and $R^4$, which may be identical to or different from each other, can be $(C_1\text{-}C_3)$ straight chain aliphatic groups, such as methyl, ethyl or propyl. Specific second external donors can comprise, but not limited to, tetramethoxy silane, tetraethoxy silane, trimethyl methoxy silane, trimethyl ethoxy silane, dimethyl dimethoxy silane, dimethyl diethoxy silane, and so on. Alternatively, the second external electron donor component is shown as the general formula $R^5 R^6 Si(OR^7)_2$, wherein $R^5$ is $(C_1\text{-}C_3)$ straight chain aliphatic groups, such as methyl, ethyl or propyl, $R^6$ is $(C_3\text{-}C_6)$ branched or cyclized aliphatic groups, $R^7$ is $(C_1\text{-}C_3)$ straight chain aliphatic groups. Specific compounds can be e.g. methyl cyclohexyl dimethoxy silane.

Preferably, the second external electron donor is tetraethoxy silane and/or methyl cyclohexyl dimethoxy silane.

Said polymerizations of different stages are carried out in different reactors respectively in the polymerization process of the present invention. A specific embodiment is that, the polymerization in the first stage is carried out in the first reactor, and the polymerization in the second stage is carried out in the second reactor. Into the first reactor, (1) a solid catalyst component with magnesium, titanium, halogen and internal electron donor as the main components; (2) an organic aluminium component; and (3) the first external electron donor component are added, and the propylene homopolymerization is carried out substantially without hydrogen. The polymerization products obtained are introduced into the second reactor, where the second external electron donor component is added, and propylene homopolymerization is further carried out in the presence of a certain amount of hydrogen.

Said three catalyst components can be added directly into the first reactor, or added therein after the pre-complexing and/or pre-polymerization known in the art. The pre-complexing reactor can be in various types, for achieving a sufficient and effective blending of each catalyst component. The pre-complexing reactor can be a continuous stirred tank reactor, a tubular loop reactor, a section of pipe comprising a static mixer, or even a section of pipe in which the materials are in turbulent state.

The pre-complexing temperature is controlled within −10 to 60° C., and preferably within 0 to 30° C. The pre-complexing time is controlled within 0.1 to 180 min, and preferably within 5 to 30 min.

The catalyst with or without pre-complexing can be optionly prepolymerized. The prepolymerization can be carried out continuously in the liquid phase, or intermittently in an inert solvent. The prepolymerization reactor can be a continuous stirred tank, a tubular loop reactor, and so on. The prepolymerization temperature is controlled within −10 to 60° C., and preferably within 0 to 40° C. The prepolymerization multiple is controlled within 0.5 to 1000 times, and preferably within 1.0 to 500 times.

Said polymerization can be carried out in the propylene liquid phase, or in gas phase, or by using liquid-gas phase combined technology. When the liquid phase polymerization is carried out, the polymerization temperature is 0 to 150° C., preferably 40 to 100° C., and the polymerization pressure should be higher than the saturated vapor pressure of propylene at the corresponding polymerization temperature. In gas polymerization, the polymerization temperature is 0 to 150° C., preferably 40 to 100° C., and the polymerization pressure can be the normal pressure or higher, preferably 1.0 to 3.0 MPa (gauge pressure, the same below).

The polymerization can be carried out continuously or intermittently. The continuous polymerization can be carried out in two or more liquid-phase reactors or gas-phase reactors that are connected in series, wherein the liquid-phase reactor can be a tubular loop reactor or a stirred tank reactor, and the gas-phase rector can be a horizontal stirred bed reactor or a vertical stirred bed reactor. The above mentioned liquid-phase reactor and gas-phase reactor can be combined together in any suitable manner. The propylene homopolymerization is preferably carried out in two or more tubular loop reactors connected in series.

The polymer obtained in the present invention can be extruded and granulated by using suitable equipments. During granulation, additives commonly used in the field, such as antioxidant, light stabilizer, heat stabilizer, colorant and filler, are generally added.

In the preparation process for polymer of the present invention, by adjusting the amount and species of the external electron donors and the amount of hydrogen that are added into the two reactors connected in series or into different stages at intermittent operation, no specific catalyst is needed, nor any multi-functional copolymerization monomer should be added. Compared with the conventional process of adjusting the polymer molecular weight distribution only by different hydrogen concentration, higher molecular weight component can be obtained with less amount of hydrogen according to the present invention. As a result, products with better performance can be prepared through a more cost-effective manner.

By means of the polymerization process of the present invention, propylene polymer with wide molecular weight distribution can be obtained, and the foremost characteristic thereof is that the content of very high molecular weight fraction is higher and at the same time the content of low molecular weight fraction is also beyond a certain amount. As such, the melt strength of the propylene polymer is significantly increased, and the processing performance of the polymer can be guaranteed.

The most specific process for preparing propylene homopolymer with high melt strength in the present invention is characterized in that a two-stage propylene homopolymerization reaction is carried out in two tubular loop reactors connected in series, wherein: in the first stage, in the presence of Ziegler-Natta catalyst, the propylene homopolymerization reaction is carried out at the polymerization temperature of 50 to 100° C. with a hydrogen content less than or equal to 300 ppmV, the MFR of the obtained polymer being controlled within 0.01 to 0.3 g/10 min, and said Ziegler-Natta catalyst is composed of the following components: (1) a solid catalyst component with magnesium, titanium, halogen and internal electron donor as the main components, (2) an organic aluminium component, and (3) dicyclopentyl dimethoxy silane, wherein the weight ratio of component (1) to component (2), based on the ratio of titanium to aluminium, is 1:10-500, and the weight ratio of component (2) to component (3) is 10-150:1; and in the second stage, based on the resulting material from the first stage, tetraethoxy silane is added in the presence of hydrogen to further carry out the proplylene homopolymerization, and the amount of tetraethoxy silane is determined according to the amount of the organic aluminium component added in the first stage, so that the weight ratio of that to organic aluminium is 1:1~50, the MFR of the final polymer being controlled within 0.2 to 10 g/10 min.

The present invention further provides a corresponding propylene homopolymer with high melt strength, comprising the following features:

(1) the MFR is 0.2-10 g/10 min at 230° C. with a load of 2.16 kg,
(2) the molecular weight distribution $M_w/M_n$ is 6-20,
(3) the content of the fraction with a molecular weight higher than 5,000,000 is higher than or equal to 0.8 wt %,
(4) $M_{z+1}/M_n$ is higher than or equal to 70.

It is necessary to increase the polymer molecular weight for increasing the polymer melt strength. However, in order to ensure the product has excellent processing performance, it is critical to control the molecular weight distribution within a region of a certain mean molecular weight, i.e. a certain MFR. In the polymer, on one hand, it needs to have a certain amount of very high molecular weight fraction, and on the other hand, it also needs to have a large amount of low molecular weight fraction, i.e. it needs a wider region of molecular weight distribution.

As well known, macromolecular is not composed of compound with a single molecular weight. Even a kind of pure macromolecular is also composed of mixtures of the same series of polymer having the same chemical component, different molecular weights and different structures. The property that macromolecular has uneven molecular weights, i.e. the size of molecular weight is different, is called as the polydispersity of molecular weight. Generally, the measured molecular weight of macromolecular is the mean molecular weight. The mean molecular weight of polymer is the same, but the polydispersity thereof is not necessarily the same. Generally speaking, the gel permeating chromatography is used to measure the molecular weight distribution of polymer, and then the number average molecular weight, weight average molecular weight, Z average molecular weight and Z+1 average molecular weight can be obtained according to the molecular weight distribution curve. The weights of the high molecular weight fraction on the above molecular weight mean values are different, and they meet the following relationship: $M_n<M_w<M_z<M_{z+1}$. Generally, $M_w/M_n$ is used to express the molecular weight distribution of polymer, wherein $M_n$ is close to the low molecular weight part of polymer, i.e., the effect of the low molecular weight part on $M_n$ is greater, and $M_w$ is close to the high molecular weight part of polymer, i.e., the effect of the high molecular weight part on $M_w$ is greater. In order to enable polypropylene to have better comprehensive performance or processing performance, the molecular weight distribution of propylene polymer, i.e., $M_w/M_n$, is generally controlled within 6 to 20.

However, the inventor has found after intensive experiments that, it cannot meet the requirement for achieving high melt strength only by controlling the data of $M_w/M_n$, and it also has to quantitatively control the very high molecular weight fraction within a certain range. It is specially preferred to quantitatively control both of the very high molecular weight fraction and the low molecular weight fraction within a certain range respectively. Taking into account that a small amount of very high molecular weight fraction does not affect $M_w$ significantly, but affects $M_{z+1}$ significantly, and a large amount of low molecular weight fraction affects $M_n$ greatly, it is very important to ensure $M_{z+1}/M_n$ is greater than or equal to 70 in the propylene polymer of the present invention.

In the above propylene homopolymer of the present invention, the content of the fraction with a molecular weight higher than 5,000,000 is preferably higher than or equal to 1.0 wt %, and more preferably higher than or equal to 1.5 wt %. Preferably, $M_{z+1}/M_n$ is higher than or equal to 80. The content of the fraction with a molecular weight less than 50,000 is preferably higher than or equal to 15.0 wt % and less than or equal to 40.0 wt %, and more preferably higher than or equal to 17.5 wt % and less than or equal to 30.0 wt %.

Preferably, the MFR of the propylene homopolymer is 1.6 to 6 g/10 min, and more preferably 2.5 to 6 g/10 min, at 230° C. with a load of 2.16 kg.

Besides, polymer with a polydispersity index PI of 6.0-20.0, preferably 9.0-16.0, is obtained in the present invention by controlling each molecular weight fraction.

The melt point Tm of the propylene homopolymer in the present invention is greater than or equal to 163° C., and the peak temperature of ATREF temperature rising elution curve, i.e. Tpeak-atref, is greater than or equal to 122° C. The content of xylene-soluble substances is less than or equal to 4 wt %.

The propylene homopolymer with high melt strength of the present invention preferably comprises the following features:

(1) MFR is 0.2 to 10 g/10 min, preferably 1.6 to 6 g/10 min, at 230° C. with a load of 2.16 kg,
(2) the molecular weight distribution $M_w/M_n$ is 6-20, (3) the content of the fraction with a molecular weight greater than 5,000,000 is higher than or equal to 0.8 wt %, preferably higher than or equal to 1.0 wt %,
(4) the $M_{z+1}/M_n$ is higher than or equal to 70, preferably higher than or equal to 80.

More preferably, said propylene homopolymer comprises the following features:
(1) MFR is 1.6 to 6 g/10 min at 230° C. with a load of 2.16 kg,
(2) the molecular weight distribution $M_w/M_n$ is 6-20,
(3) the content of the fraction with a molecular weight higher than 5,000,000 is higher than or equal to 1.0 wt %,
(4) $M_{z+1}/M_n$ is higher than or equal to 80,
(5) the content of the fraction with a molecular weight less than 50,000 is higher than or equal to 17.5 wt % and less than or equal to 30.0 wt %,
(6) the polymer polydispersity index PI is 9-16.

The polymer of the present invention has a melt strength higher than that of the prior arts. The melt strength is higher than 0.8 N, even higher than 2.2 N. The polymer of the present invention is mainly used to prepare foam products, biaxial stretching films, thermoforming products and blow molded products.

SPECIFIC EMBODIMENTS OF THE INVENTION

In the following the present invention will be described in more detail with specific examples, which should be construed only as explaining the present invention but not limiting the scope of the present invention.

The data related to the polymers in the examples are obtained through the following test methods.

① The thermalforming temperature is measured according to ASTM D648-07.

② The melt strength is measured by Rheoten Melt Strength Meter produced by Geottfert Werkstoff Pruefmaschinen, Germany. Said meter comprises a pair of rollers rotating in opposite directions. Polymer is melt and plasticized through a single-screw extruder, then is extruded from a hole die head with a 90° steering. Subsequently, polymer is clamped between two rollers and uniaxially drawn in a manner of constant acceleration. The tension is measured by a corresponding component for measuring the force. The measured maximum force value from the beginning of drawing to fracture of the melt is said melt strength.

③ The melt flow rate(MFR) is measured according to ISO1133 in 230° C. with a load of 2.16 kg.

④ As to the molecular weight polydispersity index, i.e., PI, firstly the rheometer with the type of ARES, i.e., Advanced Rheometer Extension System, sold by Rheometric Scientific Inc., US, is used to measure the values of viscosity and modulus of sample in 190° C. and within a certain frequency range, wherein the sample is held through a flatbed type fixture. The molecular weight polydispersity index, i.e., PI, is equal to $10^5/G$, wherein G is the modulus value at the intersection point of the storage modulus (G')-frequency curve and the loss modulus (G")-frequency curve. The resin sample is molded into a sheet of 2 mm at 200° C. before being measured.

⑤ As to the molecular weight distribution (Mw/Mn, Mz+1/Mn), the PL-GPC220 gel permeating chromatography produced by Polymer Laboratories, Inc., Great Britain, and IR5 detector produced by Polymer Char Inc., Spain, are used to measure the molecular weight and molecular weight distribution of the sample, wherein the chromatography columns are three Plgel 10 μm MIXED-B columns connected in series, the solvent and fluid phase is 1,2,4-trichlorobenzene (comprising 0.3 g/1000 ml antioxidant 2,6-dibutyl p-cresol), the column temperature is 150° C., and flow rate is 1.0 ml/min.

⑥ The resin tensile strength is measured according to ASTM D638-00.

⑦ The bending strength and bending modulus of resin are measured according to ASTM D790-97.

⑧ The IZOD notch impact strength is measured according to ASTM D256-00.

⑨ The intrinsic viscosity is measured according to ASTM D 5225-1998 by using Y501C intrinsic viscosity analyzer produced by VISCOTEK Inc., US. The solvent is decalin, and the test temperature is 135° C.

⑩ The content of soluable substances is measured by using the CRYSTEX instrument produced by PolyChar, Inc., Spain, and the solvent is trichlorobenzene. The result is corrected by the cool xylene soluable substance data of the polymer measured according to ASTM D5492-2006 standard.

Example 1

The polymerization is carried out in a polypropylene pilot plant. The main equipment thereof comprises a prepolymerizaiton reactor, a first tubular loop reactor and a second tubular loop reactor. The polymerization process and its steps are as follows.

(1) Prepolymerization

The main catalyst, i.e., the solid catalyst active component containing titanium, is obtained by using the method described in Example 1 of CN93102795, wherein the content of Ti is 2.4 wt %, the content of Mg is 18.0 wt %, and the content of dibutyl phthalate is 13 wt %.

The main catalyst, the cocatalyst (triethylaluminium) and the first external electron donor (dicycylpentyl dimethoxy silane, DCPMS) are pre-contacted with each other at 10° C. for 20 min, and then continuously added into the prepolymerization reactor for prepolymerization. The prepolymerization is carried out in the propylene liquid phase bulk, wherein the temperature is 15° C., the residence time is about 4 min, and the propolymerization multiple of the catalyst is about 120 to 150 times in such conditions. Into the prepolymerization reactor, the flow rate of triethylalumnium is 6.33 g/hr, the flow rate of the dicycylpentyl dimethoxy silane is 0.33 g/hr, and the flow rate of the main catalyst is about 0.01 g/hr.

(2) Propylene Homopolymerization

After prepolymerization, the catalyst flows into the two tubular loop reactors connected in series, where the propylene homopolymerization is completed. The reaction temperature of the two tubular loop reactors is 70° C., and the reaction pressure thereof is 4.0 MPa. The process conditions of the tubular loop reactor are controlled to achieve the productivity ratio of the first tubular loop reactor to that of the second tubular loop reactor of about 45:55.

No hydrogen is added in the feed to the first tubular loop reactor, and the hydrogen content measured by the online chromatography is less than 10 ppmV. A certain amount of hydrogen is added in the feed to the second tubular loop reactor, and the hydrogen content measured by the online chromatography is 4500 ppmV.

As the catalyst components are added directly into the first tubular loop reactor after prepolymerization, there is not any other feed to the first tubular loop reactor except propylene. As a result, the weight ratio of triethylaluminium to dicyclopentyl dimethoxy silane in the first tubular loop reactor (hereinafter referred to as Al/Si-I) is that in the catalyst prepolymer, i.e., 19.0.

Tetraethoxy silane (TEOS) with a flow rate of 0.67 g/hr is supplemented into the second tubular loop reactor. Therefore, the weight ratio of triethylaluminium to tetraethoxy silance in the second tubular loop reactor (hereinafter referred to as Al/Si-II) is 9.4. The specific process conditions are shown in Table 1.

After the propylene is separated by flashing from the polymer from the second tubular loop reactor, the activity of the catalyst in the reactor is eliminated by wet nitrogen. Then, polymer powders are obtained after heating and drying the polymer.

0.1 wt % IRGAFOS 168 additive, 0.2 wt % IRGANOX 1010 additive and 0.05 wt % calcium stearate are added into the powders obtained by polymerization, and then the mixture is granulated through a double-screw extruder. The properties of the obtained granules are tested according to the existing ASTM standard.

Example 2

Example 2 differs from Example 1 in that: a small amount of hydrogen is added in the propylene supplementing feed of the first tubular loop reactor, and the hydrogen content measured by the online chromatography is 230 ppmV; the hydrogen feed amount in the propylene supplementing feed of the second tubular loop reactor is adjusted to 8500 ppmV; the Al/Si-I is adjusted to 45 (wt:wt) and Al/Si-II is adjusted to 4.2 (wt:wt) through adjusting the feed amount of the external electron donors; and the amount of cocatalyst triethylaluminium added is unchanged.

Example 3

Exmaple 3 differs from Example 2 only in that the Al/Si-I is adjusted to 85 (wt:wt) through adjusting the feed amount of the external electron donors, while the amount of cocatalyst triethylaluminium added is unchanged.

Example 4

Example 4 differs from Example 3 only in that the hydrogen amount in the propylene supplementing feed of the second tubular loop reactor is adjusted to 12000 ppmV.

Example 5

Example 5 differs from Example 2 only in that the tetraethoxy silane in the second tubular loop reactor is changed to methyl cyclohexyl dimethoxy silane (CHMMS), the adding amount thereof is 1.51 g/hr, the Al/Si-II is 4.2 (wt:wt), and the Al/Si-I in the first tubular loop reactor is adjusted to 60.

The specific process parameters, the obtained polymer analysis results and the polymer physical properties of each example are listed in Tables 1 to 4.

TABLE 1

The polymerization process conditions in Examples

| Process conditions | | | Example 1 | Example 2 | Example 3 | Example 4 | Example 5 |
|---|---|---|---|---|---|---|---|
| External electron donor | First reactor | | DCPMS | DCPMS | DCPMS | DCPMS | DCPMS |
| | Second reactor | | TEOS | TEOS | TEOS | TEOS | CHMMS |
| Al/Si | First reactor Al/Si-I | w/w | 19 | 45 | 85 | 85 | 60 |
| | Second reactor Al/Si-II | w/w | 9.4 | 4.2 | 4.2 | 4.2 | 4.2 |
| $H_2$ feed | First reactor | ppmV | 0 | 230 | 230 | 230 | 230 |
| | Second reactor | ppmV | 4500 | 8500 | 8500 | 12000 | 8500 |

TABLE 2

The analysis results of polymers in Examples (1)

| | MFR (g/min) | | Intrinsic viscosity (dl/g) | | Content of soluble substances (wt %) | |
|---|---|---|---|---|---|---|
| | First reactor | Second reactor | First reactor | Second reactor | First reactor | Second reactor |
| Example 1 | 0.03 | 1.6 | 5.9 | 3.4 | 3.0 | 2.4 |
| Example 2 | 0.08 | 2.7 | 5.3 | 2.8 | 4.4 | 2.8 |
| Example 3 | 0.08 | 3.0 | 5.2 | 2.7 | 4.7 | 3.3 |
| Example 4 | 0.08 | 3.9 | 5.1 | 2.4 | 5.0 | 2.6 |
| Example 5 | 0.08 | 1.9 | 5.0 | 3.2 | 4.4 | 3.2 |

TABLE 3

The analysis results of polymers in Examples (2)

| No. | GPC | | | | | | | | Rheological method PI |
|---|---|---|---|---|---|---|---|---|---|
| | Mn, $10^4$ | Mw, $10^4$ | Mz, $10^4$ | Mz+1, $10^4$ | Mw/Mn | Mz+1/Mn | $10^3 < M < 5 \times 10^4$ fraction content (wt %) | $M > 5 \times 10^6$ fraction content (wt %) | |
| Example 1 | 5.9 | 66.5 | 282.9 | 511.0 | 11.2 | 86.3 | 17.8 | 1.86 | 15.0 |
| Example 2 | 4.4 | 51.5 | 24.3 | 512.1 | 11.1 | 115.5 | 20.9 | 1.14 | 9.3 |
| Example 3 | 4.4 | 53.5 | 28.8 | 581.9 | 12.1 | 131.7 | 23.1 | 1.61 | 13.7 |
| Example 4 | 3.2 | 49.6 | 229.3 | 481.8 | 15.6 | 151.9 | 22.0 | 0.98 | 8.6 |
| Example 5 | 3.7 | 49.7 | 205.5 | 427.7 | 13.6 | 116.5 | 19.0 | 0.81 | 7.1 |

TABLE 3-continued

The analysis results of polymers in Examples (2)

| | | | | GPC | | | | | Rheological method PI |
|---|---|---|---|---|---|---|---|---|---|
| No. | Mn, $10^4$ | Mw, $10^4$ | Mz, $10^4$ | Mz + 1, $10^4$ | Mw/Mn | Mz + 1/Mn | $10^3 < M < 5 \times 10^4$ fraction content (wt %) | $M > 5 \times 10^6$ fraction content (wt %) | |
| Commerical F280z | 4.4 | 43.3 | 166.2 | 385.8 | 9.8 | 87.7 | | 0.46 | 4.6 |
| Commerical T38F | 7.0 | 40.3 | 121.3 | 253.3 | 5.8 | 36.2 | | 0.15 | 4.1 |

Note:
F280z is the polypropylene produced by Zhenhai Refining and Chemical Branch of China Petroleum & Chemical Co., Ltd.; and T38F is the polypropylene produced by Hunan Changsheng petrochemical Co., Ltd.

TABLE 4

The polymer physical properties of Examples

| | MFR g/10 min | Tensile strength MPa | Bending strength MPa | Bending modulus GPa | Melt strength N | Thermal forming temperature 0.46 kg load, °C. | IZOD notch impact strength (J/m) | |
|---|---|---|---|---|---|---|---|---|
| | | | | | | | Normal temperature | −20° C. |
| Example 1 | 1.6 | 40.2 | 57.0 | 2.24 | 2.20 | 116.0 | 40.2 | 19.1 |
| Example 2 | 2.7 | 38.7 | 50.9 | 1.87 | 1.00 | 103.2 | 39.4 | 19.1 |
| Example 3 | 3.0 | 38.4 | 48.2 | 1.79 | 1.30 | 98.9 | 34.7 | 19.1 |
| Example 4 | 3.9 | 38.8 | 48.1 | 1.80 | 0.95 | 99.6 | 33.1 | 18.8 |
| Example 5 | 1.9 | 35.7 | 44.4 | 1.60 | 0.90 | 96.7 | 42.2 | 19.7 |
| Commerical F280z | 3.0 | | | | 0.4 | | | |
| Commerical T38F | 3.0 | | | | 0.31 | | | |

The invention claimed is:

1. A process for preparing propylene homopolymer with high melt strength, comprising carrying out a propylene homopolymerization reaction of two or more stages in two or more reactors connected in series, wherein
the first stage comprises carrying out a propylene homopolymerization reaction in the presence of a Ziegler-Natta catalyst comprising a first external electron donor component, under a polymerization temperature of 50-100° C., and controlling the MFR of the polymer obtained within a range of 0.01-0.3 g per 10 min, and
the second stage comprises adding, based on the resulting material from the first stage, a second external electron donor component to further carry out the propylene homopolymerization in the presence of hydrogen,
and controlling the MFR of the polymer finally obtained within a range of 0.2-10 g per 10 min, and
wherein the hydrogen response of the first external electron donor is lower than that of the second external electronic donor.

2. The process according to claim 1, wherein
in the first stage, the Ziegler-Natta catalyst is composed of the following components: (1) a solid catalyst component with magnesium, titanium, halogen and internal electron donor as the main components; (2) an organic aluminum component; and (3) the first external electron donor component, wherein the weight ratio of component (1) to component (2), based on the ratio of titanium to aluminum, is 1:10-500, and the weight ratio of component (2) to component (3) is 10-150:1; and
in the second stage, the weight ratio of the organic aluminium component to the second external electron donor component added is 1-50:1.

3. The process according to claim 2, wherein
in the first stage, the amount of the first external electron donor component is adjusted such that the weight ratio of the first external electron donor component to the organic aluminum is 1:15-100; and
in the second stage, the second external donor component is added according to the amount of the organic aluminum component added in the first stage, such that the weight ratio of the second external donor component to the organic aluminum is 1:2-20.

4. The process according to claim 1, wherein in the first stage, the hydrogen content is less than or equal to 300 ppmV.

5. The process according to claim 1, wherein the first external electron donor component is shown as the general formula $R^1{}_n Si(OR^2)_{4-n}$, wherein $R^1$, which may be identical to or different from each other, is ($C_3$-$C_6$) branched or cyclized aliphatic groups, $R^2$ is a ($C_1$-$C_3$) straight chain aliphatic group, and n is 1 or 2.

6. The process according to claim 1, wherein
the second external electron donor is shown as the general formula $R^3{}_n Si(OR^4)_{4-n}$, wherein n is 0 or 1 or 2, $R^3$ and $R^4$, which may be identical to or different from each other, are ($C_1$-$C_3$) straight chain aliphatic groups; or
the second external electron donor is shown as the general formula $R^5 R^6 Si(OR^7)_2$, wherein $R^5$ is a ($C_1$-$C_3$) straight chain aliphatic groups, $R^6$ is a ($C_3$-$C_6$) branched or cyclized aliphatic group, and $R^7$ is a ($C_1$-$C_3$) straight chain aliphatic group.

7. The process according to claim 1, wherein the productivity ratio of the first stage to the second stage is 30:70 to 70:30.

8. The process according to claim 1, wherein said propylene homopolymerization reaction is carried out in two tubular loop reactors connected in series.

9. The process according to claim 1, wherein the first external electron donor is dicyclopentyl dimethoxy silane and/or diisopropyl dimethoxy silane, and the second external electron donor is tetraethoxy silane and/or methyl cyclohexyl dimethoxy silane.

10. A process for preparing propylene homopolymer with high melt strength, comprising carrying out a propylene homopolymerization reaction of two stages in two tubular loop reactors connected in series, wherein the first stage comprises carrying out the propylene homopolymerization reaction in the presence of Ziegler-Natta catalyst, under a polymerization temperature of 50-100° C. with a hydrogen content less than or equal to 300 ppmV, and controlling the MFR of the polymer obtained within a range of 0.01-0.3 g/10 min, and said Ziegler-Natta catalyst being composed of the following components: (1) a solid catalyst component with magnesium, titanium, halogen and internal electron donor as the main components; (2) an organic aluminum component; and (3) dicyclopentyl dimethoxy silane, wherein the weight ratio of component (1) to component (2), based on the ratio of titanium to aluminum, is 1:10-500, and the weight ratio of component (2) to component (3) is 10-150:1; and the second stage comprises adding, based on the resulting material from the first stage, tetraethoxy silane in the presence of hydrogen to further carry out the propylene homopolymerization, and the amount of tetraethoxy silane is determined according to the amount of the organic aluminum component added in the first stage, so that the weight ratio of the tetraethoxy silane to the organic aluminum is 1:1-0; and controlling the MFR of the polymer finally obtained within a range of 0.2-10 g/10 min.

11. A propylene homopolymer with high melt strength, comprising the following features:
(1) the MFR is 0.2-10 g/10 min at 230° C. with a load of 2.16 kg;
(2) the molecular weight distribution $M_w/M_n$ is 6-20;
(3) the content of the fraction with a molecular weight higher than 5,000,000 is higher than or equal to 0.8 wt %; and
(4) $M_{z+1}/M_n$ is higher than or equal to 70.

12. The propylene homopolymer with high melt strength according to claim 11, wherein the content of the fraction with a molecular weight higher than 5,000,000 is higher than or equal to 1.0 wt %.

13. The propylene homopolymer with high melt strength according to claim 12, wherein the content of the fraction with a molecular weight higher than 5,000,000 is higher than or equal to 1.5 wt %.

14. The propylene homopolymer with high melt strength according to claim 11, wherein the $M_{z+1}/M_n$ thereof is higher than or equal to 80.

15. The propylene homopolymer with high melt strength according to claim 11, wherein the MFR is 2.5-6 g/10 min at 230° C. with a load of 2.16 kg.

16. The propylene homopolymer with high melt strength according to claim 11, wherein the content of the fraction with a molecular weight less than 50,000 is higher than or equal to 15.0 wt % and less than or equal to 40 wt %.

17. The propylene homopolymer with high melt strength according to claim 16, wherein the content of the fraction with a molecular weight less than 50,000 is higher than or equal to 17.5 wt % and less than or equal to 30 wt %.

18. The propylene homopolymer with high melt strength according to claim 11, wherein the polymer dispersity index PI is 6.0-20.0.

19. A propylene homopolymer with high melt strength, comprising the following features:
(1) MFR is 1.6-6 g/10 min at 230 t with a load of 2.16 kg;
(2) the molecular weight distribution Mw/Mn is 6-20;
(3) the content of the fraction with a molecular weight higher than 5,000,000 is higher than or equal to 1.0 wt %;
(4) the Mz+1/Mn is higher than or equal to 80;
(5) the content of the fraction with a molecular weight less than 50,000 is higher than or equal to 17.5 wt % and less than or equal to 30 wt %;
(6) the polymer dispersity index PI is 9.0-16.0.

* * * * *

UNITED STATES PATENT AND TRADEMARK OFFICE
CERTIFICATE OF CORRECTION

| | | |
|---|---|---|
| PATENT NO. | : 9,068,030 B2 | Page 1 of 1 |
| APPLICATION NO. | : 13/574435 | |
| DATED | : June 30, 2015 | |
| INVENTOR(S) | : Song et al. | |

It is certified that error appears in the above-identified patent and that said Letters Patent is hereby corrected as shown below:

In the claims

Claim 10, col. 15, line 30, "1:1-0;" should read --1:1-50;--

Signed and Sealed this
Tenth Day of November, 2015

Michelle K. Lee
*Director of the United States Patent and Trademark Office*